(12) United States Patent
Jothimurugesan et al.

(10) Patent No.: US 9,278,344 B2
(45) Date of Patent: Mar. 8, 2016

(54) HYBRID FISCHER-TROPSCH CATALYSTS

(71) Applicants: Kandaswamy Jothimurugesan, Hercules, CA (US); Robert James Saxton, San Rafael, CA (US)

(72) Inventors: Kandaswamy Jothimurugesan, Hercules, CA (US); Robert James Saxton, San Rafael, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 14/574,741

(22) Filed: Dec. 18, 2014

(65) Prior Publication Data

US 2015/0105236 A1  Apr. 16, 2015

Related U.S. Application Data

(60) Division of application No. 13/603,743, filed on Sep. 5, 2012, now Pat. No. 9,023,899, which is a continuation-in-part of application No. 13/428,839, filed on Mar. 23, 2012, now abandoned.

(51) Int. Cl.

| | |
|---|---|
| *B01J 21/06* | (2006.01) |
| *B01J 29/80* | (2006.01) |
| *B01J 29/76* | (2006.01) |
| *B01J 37/00* | (2006.01) |
| *B01J 37/02* | (2006.01) |
| *C10G 2/00* | (2006.01) |
| *B01J 37/04* | (2006.01) |
| *B01J 35/00* | (2006.01) |
| *B01J 35/10* | (2006.01) |

(52) U.S. Cl.
CPC .............. *B01J 29/80* (2013.01); *B01J 29/7669* (2013.01); *B01J 37/0009* (2013.01); *B01J 37/0201* (2013.01); *C10G 2/33* (2013.01); *C10G 2/332* (2013.01); *C10G 2/333* (2013.01); *C10G 2/334* (2013.01); *B01J 35/006* (2013.01); *B01J 35/1019* (2013.01); *B01J 35/1038* (2013.01); *B01J 35/1042* (2013.01); *B01J 37/04* (2013.01); *B01J 2229/186* (2013.01)

(58) Field of Classification Search
CPC .... B01J 29/80; B01J 29/7669; B01J 23/8913; B01J 37/0009; B01J 37/04; B01J 35/1019; B01J 35/1038; B01J 35/1042; B01J 35/006; C10G 2/33
USPC .......................................... 502/66, 64, 67, 71
See application file for complete search history.

(56) References Cited

U.S. PATENT DOCUMENTS

2006/0065575 A1 * 3/2006 Benard .................. C10G 45/62
                                                            208/58

OTHER PUBLICATIONS

Chinese patent CN 1393521, machine translation, Dec. 2003.*

* cited by examiner

*Primary Examiner* — Jafar Parsa
(74) *Attorney, Agent, or Firm* — Karen R. DiDomenicis

(57) ABSTRACT

Disclosed are hybrid Fischer-Tropsch catalysts containing cobalt deposited on hybrid supports. The hybrid supports contain an acidic zeolite component and a silica-containing material. It has been found that the use of the hybrid Fischer-Tropsch catalysts in synthesis gas conversion reactions results in high $C_{5+}$ productivity, high CO conversion rates and low olefin formation.

12 Claims, No Drawings

HYBRID FISCHER-TROPSCH CATALYSTS

CROSS-REFERENCE TO RELATED APPLICATIONS

This application is a divisional of co-pending application Ser. No. 13/603,743 filed Sep. 5, 2012, which is in turn a continuation-in-part of application Ser. No. 13/428,839 filed Mar. 23, 2012. This application claims priority to and benefits from each of the foregoing applications, the disclosures of which are incorporated herein by reference.

FIELD

The present disclosure relates to hybrid synthesis gas conversion catalysts containing a Fischer-Tropsch component deposited onto a hybrid support.

BACKGROUND

Fischer-Tropsch synthesis is an effective process for converting synthesis gas containing hydrogen and carbon monoxide, also referred to as syngas, to liquid hydrocarbon fuels. It is well known that Fischer-Tropsch synthesis involves a polymerization reaction beginning with a methylene intermediate to produce a wide distribution of hydrocarbons ranging from light gases to solid wax. Hybrid Fischer-Tropsch catalysts, also referred to interchangeably as "hybrid FT catalysts" or "HFT catalysts," have been developed containing both a Fischer-Tropsch synthesis component, e.g. cobalt, and an acidic zeolite component which have been found to be capable of limiting chain growth in the polymerization reaction to provide a more desirable product distribution.

Challenges have been encountered in hybrid Fischer-Tropsch catalysts containing cobalt as a result of the strong interaction between the cobalt and the zeolite. These may include lower than desired catalytic activity, lower than desired degree of cobalt reduction and undesirably high methane selectivity. For example, the activity of some hybrid Fischer-Tropsch synthesis catalysts which have been reported is about 0.2 g of $C_{5+}/g_{cat}/h$ (U.S. Pat. Nos. 7,973,087; 7,973,086; 7,943,674; and 7,825,164). Generally, it is preferred that the activity of a catalyst be higher.

Another challenge in the development of improved hybrid Fischer-Tropsch catalysts is the development of catalysts which are active, stable and provide high $C_{5+}$ productivity. Deactivation of hybrid FT catalysts can occur due to a variety of causes, including sintering, surface carbon formation, cobalt-support mixed compound formation, cobalt oxidation and poisoning. Deactivation of HFT catalyst results in reduced yields of desired products. Catalyst deactivation by some of these can be addressed by regeneration. However, some modes of deactivation lead to permanent deactivation from which the catalyst cannot be regenerated. Additionally, high water partial pressures can oxidize active cobalt metal to inactive cobalt oxide. Water partial pressure above a certain value leads to high rates of catalyst deactivation. This puts a limit on the maximum per-pass carbon monoxide conversion that a catalyst can experience for acceptable deactivation. Accordingly, it is important to improve water resistance from the point of view of catalyst activity and catalyst life. Common poisons for FT catalysts include sulfur, nitrogen-containing compounds such as hydrogen cyanide and ammonia. Catalyst deactivation by sulfur cannot be regenerated. Other modes of deactivation include coalescence of cobalt metal crystallites leading to a loss of metal surface area. Catalyst deactivation by this mechanism cannot be regenerated.

Hybrid Fischer-Tropsch synthesis also generally produces a large percentage of olefinic hydrocarbons. An olefinic hydrocarbon is defined as a hydrocarbon in which one or more double bonds exist within the molecule. Olefinic, or unsaturated, hydrocarbons have the potential to be disruptive to refining processes, creating problems including crude heater and preheat train fouling, storage instability and gum deposits. Furthermore, the hydrogenation of olefins, apart from diene saturation, is not practiced in crude oil refining. For this reason, synthetic hydrocarbon mixtures must be treated so as to substantially remove unsaturated hydrocarbons before being blended into crude oil.

It would be desirable to have a means for converting synthesis gas to a hydrocarbon mixture having a low percentage of olefins. There remains a need for hybrid Fischer-Tropsch catalysts with improved catalytic activity which provides improved productivity in a desired range of product distribution, i.e., $C_{5+}$.

SUMMARY

In one aspect, a hybrid Fischer-Tropsch catalyst is provided, the catalyst including a hybrid support and a Fischer-Tropsch component deposited on the hybrid support. The hybrid support has a pore volume of from 0.4 to 1.4 cc/g and a BET surface area of from 100 to 450 $m^2/g$. The hybrid support contains at least one zeolite, a binder material, and a silica- and/or alumina-containing material.

In another aspect, a process for synthesis gas conversion is provided. The process includes contacting a synthesis gas feed comprising hydrogen and carbon monoxide having a $H_2/CO$ ratio between 1 and 2.5 with the hybrid Fischer-Tropsch catalyst in a reactor at a temperature from 200 to 260° C., a pressure from 5 to 40 atmospheres, and a gaseous hourly space velocity less than 20,000 volumes of gas per volume of catalyst per hour. In one embodiment, the hydrocarbon product produced contains at least 50 wt % $C_{5+}$ hydrocarbons at a $C_{5+}$ productivity greater than 0.5 $gC_{5+}/g_{cat}/h$. In another embodiment, the hydrocarbon product produced contains less than 27 wt % olefins.

DETAILED DESCRIPTION

Hybrid Fischer-Tropsch catalysts according to the present disclosure include at least one Fischer-Tropsch component deposited on a hybrid support which contains at least one acidic component. As is known, the presence of an acidic component such as a zeolite enables the hybrid Fischer-Tropsch catalyst to limit the formation of undesirable heavy hydrocarbon components, such as $C_{21+}$ wax. The hybrid supports of hybrid Fischer-Tropsch catalysts according to the present disclosure further include a binder material and a silica- and/or alumina-containing material.

The acidic component of the hybrid support can be an acid catalyst material such as amorphous silica-alumina, tungstated zirconia, or a zeolitic or non-zeolitic crystalline molecular sieve. Examples of suitable zeolites include ZSM-12, ZSM-5, ZSM-22, ZSM-48, SSZ-32, SSZ-57, beta and combinations thereof. Other suitable molecular sieves include zeolite Y, zeolite X and the so called "ultra stable zeolite Y" and high structural silica:alumina ratio zeolite Y, such as described in U.S. Pat. Nos. 4,401,556; 4,820,402; and 5,059,567. Small crystal size zeolite Y, such as described in U.S. Pat. No. 5,073,530, can also be used. Other zeolites which show utility include those designated as SSZ-13, SSZ-33, SSZ-46, SSZ-53, SSZ-55, SSZ-58, SSZ-59, SSZ-64, ZSM-11, ZSM-23, H-Y, beta, mordenite, SSZ-74, TON type zeolites, ferrierite, SSZ-60 and SSZ-70. Non-zeolitic molecular sieves which can be used include, for example silicoaluminophosphates (SAPO), ferroaluminophosphate, titanium aluminophosphate and the various ELAPO molecular sieves described in U.S. Pat. No. 4,913,799 and the references cited therein. Details regarding the preparation of various non-zeolite molecular sieves can be found in U.S. Pat. Nos. 5,114,563; 4,913,799 and the various references cited in U.S. Pat. No. 4,913,799. Mesoporous molecular sieves can also be included, for example the M41S family of materials (J. Am. Chem. Soc. 1992, 114, 10834-10843), MCM-41 (U.S. Pat. Nos. 5,246,689; 5,198,203; 5,334,368), and MCM48 (Kresge et al., Nature 359 (1992) 710).

The amount of acidic component used in the catalyst can be suitably varied to obtain the desired product. For instance, if the amount of acidic component is too low, there may be insufficient cracking to remove a desired amount of wax; whereas if too much acidic component is used, there may be excessive cracking and the resulting product may be lighter than desired. Based on the weight of the hybrid support, the hybrid support contains at least 25 wt % zeolite.

The zeolite of the hybrid support may further contain a promoter such as platinum, ruthenium, rhenium, silver, palladium, nickel, rhodium, iridium or combinations thereof.

Suitable binder materials for use in the hybrid support include alumina, silica, titania, zirconia and combinations thereof. The hybrid support advantageously contains at least 10 wt % binder.

It has been found that the inclusion of silica- and/or alumina-containing materials in the hybrid support results in a surprising increase in $C_{5+}$ productivity of the hybrid Fischer-Tropsch catalyst. Without wishing to be bound by theory, it is believed that the presence of mesoporous silica-containing materials, alumina-containing materials or a combination of silica-containing and alumina-containing materials, with their larger pores than those of microporous zeolites, results in a larger number of active Fischer-Tropsch component sites, in turn resulting in greater Fischer-Tropsch synthesis activity. The mesopore structures favor quick mass diffusion of syngas or products.

Suitable silica-containing materials for use in the hybrid support include silica, silica-alumina, silica-zirconia, silica-titania and combinations thereof. The silica-containing material is preferably modified with a modifier such as zirconium, strontium, niobium, hafnium, magnesium, titanium, zinc, cerium, gallium, barium or combinations thereof. In one embodiment, the hybrid support can contain from 25 to 65 wt % silica-containing material. The use of the silica-containing material has been found to provide a number of advantages. The degree of reduction of cobalt has been found to be generally high on silica. Silica has also been found to have low methane selectivity, which in turn helps increase the $C_{5+}$ selectivity. Suitable alumina-containing materials for use in the hybrid support include, for example, gamma-alumina. The alumina-containing material is preferably modified with a modifier such as zirconium, titanium, cerium or combinations thereof. In one embodiment, the hybrid support can contain from 20 to 40 wt % alumina-containing material.

The hybrid support contains a silica-containing material, an alumina-containing material or both a silica-containing material and an alumina-containing material. The relative amounts of silica-containing and alumina-containing can vary between 0 and 100%. The percent by weight of the silica-containing material and/or alumina-containing material relative to the hybrid support is from 20 to 70 wt %. In one embodiment, the hybrid support has a pore volume of from 0.4 cc/g to 1.4 cc/g. In one embodiment, the hybrid support has a BET surface area of from 100 to 450 $m^2/g$.

The Fischer-Tropsch component may also be referred to herein as the "Fischer-Tropsch metal," "synthesis gas conversion component" or "syngas conversion component." The Fischer-Tropsch component includes a Group VIII of the Periodic Table metal component, preferably cobalt, iron and/or ruthenium. References to the Periodic Table and groups thereof used herein refer to the IUPAC version of the Periodic Table of Elements described in the 68th Edition of the Handbook of Chemistry and Physics (CPC Press). The optimum amount of catalytically active metal present depends inter alia on the specific catalytically active metal. Typically, the amount of cobalt present in the catalyst may range from 1 to 100 parts by weight per 100 parts by weight of support material, preferably from 10 to 50 parts by weight per 100 parts by weight of support material. In one embodiment, from 15 to 45 wt % cobalt is deposited on the hybrid support as the Fischer-Tropsch component. In another embodiment from 20 to 45 wt % cobalt is deposited on the hybrid support.

The catalytically active Fischer-Tropsch component may be present in the catalyst together with one or more metal promoters or co-catalysts. The promoters may be present as metals or as metal oxide, depending upon the particular promoter concerned. Suitable promoters include metals or oxides of metals from Groups IA, IB, IVB, VB, VIB and/or VIIB of the Periodic Table, lanthanides and/or the actinides or oxides of the lanthanides and/or the actinides. As an alternative or in addition to the metal oxide promoter, the catalyst may comprise a metal promoter selected from Groups VIIB and/or VIII of the Periodic Table. In some embodiments, the Fischer-Tropsch component further comprises a cobalt reduction promoter selected from the group consisting of platinum, ruthenium, rhenium, silver and combinations thereof.

The method employed to deposit the Fischer-Tropsch component on the hybrid support involves an impregnation technique using aqueous or non-aqueous solution containing a soluble cobalt salt and, if desired, a soluble promoter metal salt, e.g., platinum salt, in order to achieve the necessary metal loading and distribution required to provide a highly selective and active hybrid synthesis gas conversion catalyst.

Initially, the hybrid support can be treated by oxidative calcination at a temperature in the range of from 450° to 900° C., for example, from 600° to 750° C., to remove water and any organics from the hybrid support.

Suitable solvents include, for example, water, ketones, such as acetone, butanone (methyl ethyl ketone); the lower alcohols, e.g., methanol, ethanol, propanol and the like; amides, such as dimethyl formamide; amines, such as butylamine; ethers, such as diethylether and tetrahydrofuran; hydrocarbons, such as pentane and hexane; and mixtures of the foregoing solvents. In one embodiment, the solvent is ethanol, for use with cobalt nitrate.

Suitable cobalt salts include, for example, cobalt nitrate, cobalt acetate, cobalt carbonyl, cobalt acetylacetonate, and the like. Likewise, any suitable platinum salt, such as chloroplatinic acid hexahydrate, tetraammineplatinum nitrate, tetraamminoplatinum hydroxide or the like can be used. In one embodiment, tetraammineplatinum nitrate is used. In general, any metal salt which is soluble in the suitable solvent and will not have a poisonous effect on the metal catalyst or on the acid sites of the hybrid support can be used.

The calcined hybrid support is then impregnated in a dehydrated state with the aqueous or non-aqueous solvent solution of the metal salts. Care should be taken so that the calcined hybrid support is not unduly exposed to atmospheric humidity so as to become rehydrated.

Any suitable impregnation technique can be employed including techniques well known to those skilled in the art so as to distend the catalytic metals in a uniform thin layer on the catalyst hybrid support. For example, the cobalt along with the oxide promoter can be deposited on the hybrid support material by the "incipient wetness" technique. Such technique is well known and requires that the volume of aqueous or non-aqueous solution be predetermined so as to provide the minimum volume which will just wet the entire surface of the hybrid support, with no excess liquid. Alternatively, the excess solution technique can be used if desired. If the excess solution technique is used, then the excess solvent present, e.g., ethanol is merely removed by evaporation.

Next, the aqueous or non-aqueous solution and hybrid support are stirred while evaporating the solvent at a temperature of from 25° to 50° C. until "dryness."

The impregnated catalyst is slowly dried at a temperature of from 110° to 120° C. for a period of about 1 hour to spread the metals over the entire hybrid support. The drying step is conducted at a very slow rate in air.

The dried catalyst may be reduced directly in hydrogen or it may be calcined first. In the case of impregnation with cobalt nitrate, direct reduction can yield a higher cobalt metal dispersion and synthesis activity, but reduction of nitrates is difficult to control; calcination before reduction may be preferred for large scale preparations. A single calcination step to decompose nitrates may be preferred if multiple impregnations are needed to provide the desired metal loading. Reduction in hydrogen requires a prior purge with inert gas, a subsequent purge with inert gas and a passivation step in addition to the reduction itself, as described later as part of the reduction-oxidation-reduction (ROR) activation. However, impregnation of cobalt carbonyl is preferably carried out in a dry, oxygen-free atmosphere and decomposed directly, then passivated.

The dried catalyst is calcined by heating slowly in flowing air, for example 10 cc/gram/minute, to a temperature in the range of from 200° to 350° C., for example, from 250° to 300° C., that is sufficient to decompose the metal salts and fix the metals. The aforesaid drying and calcination steps can be done separately or can be combined. Calcination should be conducted by using a slow heating rate of, for example, 0.5° to 3° C. per minute or from 0.5° to 1° C. per minute and the catalyst should be held at the maximum temperature for a period of from 1 to 20 hours, for example, for 2 hours.

The foregoing impregnation steps are repeated with additional solutions in order to obtain the desired metal loading. Platinum and other promoter metal oxides are conveniently added together with cobalt, but they may be added in other impregnation steps, separately or in combination, either before, after, or between impregnations of cobalt.

The hybrid FT catalyst prepared according to any of the foregoing methods can optionally be further activated prior to use in a synthesis gas conversion process by either reduction in hydrogen or a reduction-oxidation-reduction (ROR) treatment. The reduction or ROR activation treatment is conducted at a temperature considerably below 500° C. in order to achieve the desired increase in activity and selectivity of the hybrid FT catalyst. Temperatures of 500° C. or above reduce activity and liquid hydrocarbon selectivity of the catalyst. Suitable reduction or ROR activation temperatures are below 500° C., even below 450° C. and even at or below 400° C. Thus, ranges of from 100° C. or 150° C. to 450° C., for example, from 250° C. to 400° C., are suitable for the reduction steps. The oxidation step should be limited to from 200° C. to 300° C. These activation steps are conducted while heating at a rate of from 0.1° C. to 5° C., for example, from 0.10° C. to 2° C.

The catalyst can be slowly reduced in the presence of hydrogen. If the catalyst has been calcined after each impregnation, to decompose nitrates or other salts, then the reduction may be performed in one step, after an inert gas purge, with heating in a single temperature ramp (e.g., 1° C./min.) to the maximum temperature and held at that temperature, from 250° C. or 300° C. to 450° C., for example, from 350° C. to 400° C., for a hold time of from 6 to 65 hours, for example, from 16 to 24 hours. Pure hydrogen is preferred in the first reduction step. If nitrates are still present, the reduction is best conducted in two steps wherein the first reduction heating step is carried out at a slow heating rate of no more than 5° C. per minute, for example, from 0.1° C. to 1° C. per minute up to a maximum hold temperature of from 200° C. to 300° C., for example, from 200° C. to 250° C., for a hold time of from 6 to 24 hours, for example, from 16 to 24 hours under ambient pressure conditions. In the second treating step of the first reduction, the catalyst can be heated at from 0.5° C. to 3° C. per minute, for example, from 0.1° C. to 1° C. per minute to a maximum hold temperature of from 250° C. or 300° C. up to 450° C., for example, from 350° C. to 400° C. for a hold time of from 6 hours to 65 hours, for example, from 16 to 24 hours. Although pure hydrogen is preferred for these reduction steps, a mixture of hydrogen and nitrogen can be used.

Thus, the reduction may involve the use of a mixture of hydrogen and nitrogen at 100° C. for one hour; increasing the temperature 0.5° C. per minute until a temperature of 200° C.; holding that temperature for approximately 30 minutes; and then increasing the temperature 1° C. per minute until a temperature of 350° C. is reached and then continuing the reduction for approximately 16 hours. Reduction can be conducted sufficiently slowly and the flow of the reducing gas maintained sufficiently high to maintain the partial pressure of water in the offgas below 1%, to avoid excessive steaming of the outlet end of the catalyst bed. Before and after all reductions, the catalyst can be purged in an inert gas such as nitrogen, argon or helium.

The reduced catalyst can be passivated at ambient temperature (25° C. to 35° C.) by flowing diluted air over the catalyst sufficiently slowly so that a controlled exotherm of no larger than +50° C. passes through the catalyst bed. After passivation, the catalyst is heated slowly in diluted air to a temperature of from 300° C. to 350° C. in the same manner as previously described in connection with calcination of the catalyst.

The temperature of the exotherm during the oxidation step can be less than 100° C., and will be 50° C. to 60° C. if the flow rate and/or the oxygen concentration are dilute enough.

Next, the reoxidized catalyst is slowly reduced again in the presence of hydrogen, in the same manner as previously described in connection with the initial reduction of the catalyst. Since nitrates are no longer present, this reduction may be accomplished in a single temperature ramp and held, as described above for the reduction of the calcined catalysts.

The hybrid Fischer-Tropsch catalyst of the present disclosure can be utilized in a process the synthesis gas conversion in which a synthesis gas feed containing hydrogen and carbon monoxide is contacted in a reactor with the hybrid Fischer-Tropsch catalyst to produce a hydrocarbon product containing at least 50 wt % $C_{5+}$ hydrocarbons. The synthesis gas feed can have a $H_2$/CO ratio between 1 and 2.5. The reaction can occur at a temperature from 200 to 260° C., a pressure from 5 to 40 atmospheres, and a gaseous hourly space velocity less than 20,000 volumes of gas per volume of catalyst per hour. In one embodiment, the $C_{5+}$ productivity of the process is advantageously greater than 0.5 $g_{C5+}/g_{cat}/h$ (grams of $C_{5+}$ per grams of catalyst per hour). In one embodiment, the resulting hydrocarbon product contains less than 27 wt % olefins. In one embodiment, the resulting hydrocarbon product contains:

0-20 wt % $CH_4$;
0-20 wt % $C_2$-$C_4$;
50-95 wt % $C_{5+}$; and
0-5 wt % $C_{21+}$.

In one embodiment, the gaseous components of the hydrocarbon product are recycled to the reactor, and the CO conversion rate of a single pass through the reactor is from 40 to 65 mol % and the CO conversion rate of the overall process including recycle is greater than 75 mol %.

The reactor type can be selected from any reactor type known for use in a Fischer-Tropsch synthesis process, including, but not limited to, multi-tubular fixed bed reactors, circulating fluidized bed reactors, fixed fluidized bed reactors, compact heat exchange reactors and microchannel reactors. When a multi-tubular fixed bed reactor is used, the particle size of the hybrid Fischer-Tropsch catalyst can be between 1 and 3 mm. When a circulating or fixed fluidized bed reactor is used, the particle size can be between 35 and 175 μm. When a compact heat exchange reactor or microchannel reactor is used, the particle size can be between 10 and 250 μm.

Analytical Methods

BET surface area and pore volume of catalyst samples were determined from nitrogen adsorption/desorption isotherms measured at −196° C. using a Tristar analyzer available from Micromeritics Instrument Corporation (Norcross, Ga.). Prior to gas adsorption measurements, the catalyst samples were degassed at 190° C. for 4 hours. The total pore volume (TPV) was calculated at a relative pressure of approximately 0.99.

Metal dispersion and average particle diameter were measured by hydrogen chemisorption using an AutoChem 2900 analyzer available from Micromeritics Instrument Corporation (Norcross, Ga.). The fraction of surface cobalt on the catalysts was measured using $H_2$ temperature programmed desorption (TPD). Samples (0.25 g) were heated to 350° C. in $H_2$ at 1° C. $min^{-1}$ and held for 3 hours then cooled to 30° C. Then a flow of argon was used to purge the samples before heating to 350° C. at 20° C. $min^{-1}$. Hydrogen desorption was monitored using a thermal conductivity detector. TPD were repeated after oxidizing samples in 10% $O_2$/He and a second reduction in pure hydrogen. Dispersions were calculated relative to the cobalt concentration in each sample.

Average crystallite size (diameter) of cobalt in nanometers was estimated by assuming a spherical geometry of reduced cobalt. The fraction of reduced cobalt was measured by dehydrating as-prepared materials, prior to reduction, at 350° C., then cooling to room temperature and reducing in 5% $H_2$/Ar at a heating rate of 5° C. $min^{-1}$ to 350° C. Catalyst reducibility during $H_2$ TPR was measured using TGA, and weight losses were assumed to be from cobalt oxide reduction in order to calculate O/Co stoichiometric ratios. The fractional reducibility was calculated by assuming the complete reduction of $Co_3O_4$ to Co metal, calculated using the equation below:

$$d=96.2*(Co\ Fractional\ Reduction)/\%\ Dispersion$$

EXAMPLES

Example 1

A 20Co/0.05Pt/(40ZSM-12/40SiO$_2$/20Al$_2$O$_3$) catalyst was synthesized as follows. First, a 40ZSM-12/40SiO$_2$/20Al$_2$O$_3$ hybrid support was prepared using the following procedure. A SiO$_2$ support (obtained from Sigma-Aldrich, St. Louis, Mo.) was modified with 3% Zr by impregnation. Zirconium(IV) oxynitrate hydrate ZrO(NO$_3$)$_2$.6H$_2$O (obtained from Sigma-Aldrich, St. Louis, Mo.) was used as the Zr precursor. The modified support was dried for 2 hrs at 120° C. and calcined in air for 2 hrs at 500° C. ZSM-12 zeolite powder (having a Si/Al ratio of 45, obtained from Zeolyst International, Conshohocken, Pa.), the modified silica support prepared above, and 20 wt % catapal B alumina binder (obtained from Sasol Chemicals North America LLC, Houston, Tex.) were added to a mixer and mixed for 15 minutes, resulting in a mixture having 40 wt % ZSM-12, 40 wt % SiO$_2$ and 20 wt % Al$_2$O$_3$. Deionized water and a small amount of nitric acid were added to the mixed powder and the mixture was mixed for 15 minutes. The mixture was then transferred to a 1 inch (2.54 cm) Bonnot BB Gun extruder and extruded using a 1/16" (0.16 cm) dieplate containing 36 holes. The extrudate was dried first at 120° C. for 2 hours and then finally calcined in flowing air at 600° C. for 2 hours. The properties of the hybrid support are shown in Table 1.

A synthesis gas conversion catalyst containing 20 wt % Co-0.05 wt % Pt on the 1/16 inch (0.16 cm) hybrid support extrudates was prepared in a single step using non-aqueous impregnation. Cobalt(II) nitrate hexahydrate (obtained from Sigma-Aldrich, St. Louis, Mo.) and tetraamineplatinum(II) nitrate (obtained from Alfa Aesar, Ward Hill, Mass.) were dissolved in ethanol. The solution was then added to dry hybrid support extrudates. The solvent was removed in a rotary evaporator under vacuum by heating slowly to 65° C. The vacuum-dried material was then further dried in air in an oven at 120° C. overnight. The dried catalyst was then calcined at 300° C. for 2 hours in a muffle furnace. The properties of the catalyst are shown in Table 2.

Example 2

A 20Co/0.2Pt/0.3Pd/(40ZSM-12/40SiO$_2$—Al$_2$O$_3$/20Al$_2$O$_3$) catalyst was synthesized as follows. First, a 40ZSM-12/40SiO$_2$—Al$_2$O$_3$/20Al$_2$O$_3$ hybrid support was prepared using the following procedure. ZSM-12 zeolite powder (having a Si/Al ratio of 45, obtained from Zeolyst International), SIRAL 30 silica-alumina powder (obtained from Sasol Chemicals North America LLC), and 20 wt % catapal B alumina binder (obtained from Sasol Chemicals North America LLC) were added to a mixer and mixed for 15 minutes, resulting in a mixture having 40 wt % ZSM-12, 40 wt % SiO$_2$—Al$_2$O$_3$ and 20 wt % Al$_2$O$_3$. Deionized water and a small amount of nitric acid were added, and the mixture was mixed for 15 minutes. The mixture was then transferred to a 1 inch (2.54 cm) Bonnot BB Gun extruder and extruded using a 1/16" (0.16 cm) dieplate containing 36 holes. The extrudate was dried first at 120° C. for 2 hours and then finally calcined in flowing air at 600° C. for 2 hours. The properties of the hybrid support are shown in Table 1.

A synthesis gas conversion catalyst containing 20 wt % Co, 0.2 wt % Pt and 0.3 wt % Pd on the 1/16 inch (0.16 cm) hybrid support extrudates was prepared in a single step using aqueous impregnation. Cobalt(II) nitrate hexahydrate (obtained from Sigma-Aldrich), tetraamineplatinum(II) nitrate, tetraamminepalladium(II) nitrate (obtained from Alfa Aesar) were dissolved in water. The solution was then added to dry hybrid support extrudates. The solvent was removed in a rotary evaporator under vacuum by heating slowly to 75° C. The vacuum-dried material was then further dried in air in an oven at 120° C. overnight. The dried catalyst was then calcined at 300° C. for 2 hours in a muffle furnace. The properties of the catalyst are shown in Table 2.

Example 3

A 20Co/0.4Pt/0.1Pd/(30ZSM-12/10SSZ-32x/40SiO$_2$/20Al$_2$O$_3$) catalyst was synthesized as follows. First, a 30ZSM-12/10SSZ-32x/40SiO$_2$/20Al$_2$O$_3$ hybrid support was prepared using the following procedure. A SiO$_2$ support (obtained from Sigma-Aldrich) was modified with 3% Zr by impregnation. Zirconium(IV) oxynitrate hydrate ZrO(NO$_3$)$_2$.6H$_2$O (obtained from Sigma-Aldrich) was used as the Zr precursor. The modified support was dried for 2 hrs at 120° C. and calcined in air for 2 hrs at 500° C. ZSM-12 zeolite powder (having a Si/Al ratio of 45, obtained from Zeolyst International), SSZ-32x powder, the modified silica support prepared above, and 20 wt % catapal B alumina binder (obtained from Sasol Chemicals North America LLC) were added to a mixer and mixed for 15 minutes, resulting in a mixture having 30 wt % ZSM-12, 10 wt % SSZ-32x, 40 wt % SiO$_2$ and 20 wt % Al$_2$O$_3$. Deionized water and a small amount of nitric acid was added to the mixed powder and mixed for 15 minutes. The mixture was then transferred to a 1 inch (2.54 cm) Bonnot BB Gun extruder and extruded using a 1/16" (0.16 cm) dieplate containing 36 holes. The extrudate was dried first at 120° C. for 2 hours and then finally calcined in flowing air at 600° C., 2 hours. The properties of the hybrid support are shown in Table 1.

A synthesis gas conversion catalyst containing 20 wt % Co, 0.4 wt % Pt and 0.1 wt % Pd on the 1/16 inch (0.16 cm) hybrid support extrudates was prepared in a single step using non-aqueous impregnation. Cobalt(II) nitrate hexahydrate (obtained from Sigma-Aldrich), tetraamineplatinum(II) nitrate and tetraamminepalladium(II) nitrate (obtained from Alfa Aesar) were dissolved in ethanol. The solution was then added to dry hybrid extrudate supports. The solvent was removed in a rotary evaporator under vacuum by heating slowly to 65° C. The vacuum-dried material was then further dried in air in an oven at 120° C. overnight. The dried catalyst was then calcined at 300° C. for 2 hours in a muffle furnace. The properties of the catalyst are shown in Table 2.

Example 4

A 30Co/0.15Pt/0.3Pd/(35ZSM-12/20SSZ-32x/30SiO$_2$/15Al$_2$O$_3$) catalyst was synthesized as follows. First, a 30Co/0.15Pt/0.3Pd/(35ZSM-12/20SSZ-32x/30SiO$_2$/15Al$_2$O$_3$) hybrid support was prepared using the following procedure. A SiO$_2$ support (obtained from Sigma-Aldrich) was modified with 3% Zr by impregnation. Zirconium(IV) oxynitrate hydrate ZrO(NO$_3$)$_2$.6H$_2$O (obtained from Sigma-Aldrich) was used as the Zr precursor. The modified support was dried for 2 hrs at 120° C. and calcined in air for 2 hrs at 500° C. ZSM-12 zeolite powder (having a Si/Al ratio of 45, obtained from Zeolyst International), SSZ-32x powder, the modified silica support prepared above, and 15 wt % catapal B alumina binder (obtained from Sasol Chemicals North America LLC) were added to a mixer and mixed for 15 minutes, resulting in a mixture having 35 wt % ZSM-12, 20 wt % SSZ-32x, 30 wt % SiO$_2$ and 15 wt % Al$_2$O$_3$. Deionized water and a small amount of nitric acid was added to the mixed powder and mixed for 15 minutes. The mixture was then transferred to a 1 inch (2.54 cm) Bonnot BB Gun extruder and extruded using a 1/16" (0.16 cm) dieplate containing 36 holes. The extrudate was dried first at 120° C. for 2 hours and then finally calcined in flowing air at 600° C., 2 hours. The properties of the hybrid support are shown in Table 1.

A synthesis gas conversion catalyst containing 30 wt % Co, 0.15 wt % Pt and 0.3 wt % Pd on the 1/16 inch (0.16 cm) hybrid support extrudates was prepared in a single step using non-aqueous impregnation. Cobalt(II) nitrate hexahydrate (obtained from Sigma-Aldrich), tetraamineplatinum(II) nitrate and tetraamminepalladium(II) nitrate (obtained from Alfa Aesar) were dissolved in ethanol. The solution was then added to dry hybrid extrudate supports. The solvent was removed in a rotary evaporator under vacuum by heating slowly to 65° C. The vacuum-dried material was then further dried in air in an oven at 120° C. overnight. The dried catalyst was then calcined at 300° C. for 2 hours in a muffle furnace. The properties of the catalyst are shown in Table 2.

Example 5

The catalyst from Example 4 was crushed to a 50-150 μm particle size. The properties of the support and the catalyst are shown in Tables 1 and 2, respectively.

Catalyst Activation

Ten grams of each catalyst prepared as described above (Examples 1-5) was charged to a glass tube reactor. The reactor was placed in a muffle furnace with upward gas flow. The tube was purged first with nitrogen gas at ambient temperature, after which time the gas feed was changed to pure hydrogen with a flow rate of 750 sccm. The temperature to the reactor was increased to 350° C. at a rate of 1° C./minute and then held at that temperature for six hours. After this time, the gas feed was switched to nitrogen to purge the system and the unit was then cooled to ambient temperature. Then a gas mixture of 1 volume % O$_2$/N$_2$ was passed up through the catalyst bed at 750 sccm for 10 hours to passivate the catalyst. No heating was applied, but the oxygen chemisorption and partial oxidation exotherm caused a momentary temperature rise. After 10 hours, the gas feed was changed to pure air, the flow rate was lowered to 200 sccm and the temperature was raised to 300° C. at a rate of 1° C./minute and then kept at 300° C. for two hours. At this point, the catalyst was cooled to ambient temperature and discharged from the glass tube reactor. It was transferred to a 316-SS tube reactor of 0.51 in (1.3 cm) I.D. and placed in a clam-shell furnace. The catalyst bed was flushed with a downward flow of helium for a period of two hours, after which time the gas feed was switched to pure hydrogen at a flow rate of 500 sccm. The temperature was slowly raised to 120° C. at a temperature interval of 1° C./minute, held there for a period of one hour, then raised to 250° C. at a temperature interval of 1° C./minute and held at that temperature for 10 hours. After this time, the catalyst bed was cooled to 180° C. while remaining under a flow of pure hydrogen gas. All flows were directed downward.

Fischer-Tropsch Activity

Catalysts prepared and activated as described above were each subjected to a synthesis run in which the catalyst was contacted with syngas containing hydrogen and carbon monoxide. Experimental conditions and results are given in Table 3.

TABLE 1

| | Hybrid Support Composition | BET Surface Area, m$^2$/g | Pore Volume, cc/g |
|---|---|---|---|
| Example 1 | 40ZSM-12/40SiO$_2$/20Al$_2$O$_3$ | 249 | 0.7589 |
| Example 2 | 40ZSM-12/40SiO$_2$—Al$_2$O$_3$/20Al$_2$O$_3$ | 276 | 0.4655 |
| Example 3 | 30ZSM-12/10SSZ-32x/40SiO$_2$/20Al$_2$O$_3$ | 273 | 0.754 |
| Example 4 | 35ZSM-12/20SSZ-32x/30SiO$_2$/15Al$_2$O$_3$ | 204 | 0.743 |
| Example 5 | 35ZSM-12/20SSZ-32x/30SiO$_2$/15Al$_2$O$_3$ | 204 | 0.743 |

TABLE 2

| | Catalyst Composition | BET Surface Area m$^2$/g | Pore Volume, cc/g | Dispersion, % | Average Co crystallite size, nm |
|---|---|---|---|---|---|
| Example 1 | 20Co/0.05Pt/(40ZSM-12/40SiO$_2$/20Al$_2$O$_3$) | 134 | 0.4655 | 8.13 | 12.24 |
| Example 2 | 20Co/0.2Pt/0.3Pd/(40ZSM-12/40SiO$_2$—Al$_2$O$_3$/20Al$_2$O$_3$) | 146 | 0.3364 | 7.63 | 13.04 |
| Example 3 | 20Co/0.4Pt/0.1Pd/(30ZSM-12/10SSZ-32x/40SiO$_2$/20Al$_2$O$_3$) | 174 | 0.4644 | 8.67 | 11.48 |
| Example 4 | 30Co/0.15Pt/0.3Pd/(35ZSM-12/20SSZ-32x/30SiO$_2$/15Al$_2$O$_3$) | 139 | 0.3990 | 7.60 | 13.01 |
| Example 5 | 30Co/0.15Pt/0.3Pd/(35ZSM-12/20SSZ-32x/30SiO$_2$/15Al$_2$O$_3$) | 139 | 0.3990 | 7.60 | 13.01 |

TABLE 3

| | Example 1 | | | Example 2 | | | Example 3 | | | Example 4 | | | Example 5 | | |
|---|---|---|---|---|---|---|---|---|---|---|---|---|---|---|---|
| Experiment # | 1 | 2 | 3 | 1 | 2 | 3 | 1 | 2 | 3 | 1 | 2 | 3 | 1 | 2 | 3 |
| TOS, h | 75 | 93 | 118 | 76 | 119 | 147 | 76 | 100 | 123 | 143 | 215 | 311 | 145 | 190 | 214 |
| Yield Time, h | 26.0 | 18.3 | 25.0 | 30.0 | 43.0 | 28.0 | 24.0 | 23.0 | 22.0 | 23 | 17 | 24.5 | 23.5 | 22 | 24 |
| Temperature, °C | 240 | 240 | 240 | 240 | 240 | 240 | 240 | 240 | 240 | 234 | 236 | 240 | 240 | 240 | 240 |
| Pressure, atm | 20 | 20 | 20 | 20 | 20 | 20 | 10 | 15 | 20 | 20 | 20 | 20 | 20 | 20 | 20 |
| SV, mL/g/h | 6750 | 6750 | 6750 | 6750 | 6750 | 6750 | 11500 | 11500 | 11500 | 13500 | 13500 | 13500 | 13500 | 13500 | 13500 |
| H$_2$/CO Fresh Feed | 2.00 | 2.00 | 2.00 | 2.00 | 2.00 | 2.00 | 2.00 | 2.00 | 2.00 | 2.00 | 2.00 | 2.00 | 2.00 | 2.00 | 2.00 |
| H$_2$/CO Inlet to Reactor | 1.45 | 1.44 | 1.45 | 1.60 | 1.61 | 1.68 | 2.00 | 2.00 | 2.00 | 2.00 | 2.00 | 2.00 | 2.00 | 2.00 | 2.00 |
| CO/(H$_2$ + N$_2$ + CO), % | 30 | 30 | 30 | 28 | 28 | 28 | 33 | 33 | 33 | 33 | 33 | 33 | 33 | 33 | 33 |
| Recycle Ratio | 1 | 1 | 1 | 1 | 1 | 1 | 0 | 0 | 0 | 0 | 0 | 0 | 0 | 0 | 0 |
| H$_2$ Conversion, mol % | 95.6 | 95.3 | 94.6 | 90.7 | 88.6 | 84.8 | 72.2 | 71.1 | 65.6 | 50.8 | 53.2 | 57.9 | 56.9 | 52.7 | 51.9 |
| CO Conversion, mol % | 85.3 | 84.8 | 83.5 | 80.2 | 77.6 | 74.8 | 63.5 | 64.1 | 58.3 | 46.1 | 46.1 | 50.8 | 50.2 | 48.1 | 47.8 |
| C$_{5+}$ Productivity, g/g$_{cat}$/h | 0.6667 | 0.6723 | 0.6531 | 0.6094 | 0.5818 | 0.5317 | 0.8700 | 0.8023 | 0.6745 | 0.7090 | 0.7070 | 0.7610 | 0.7020 | 0.688 | 0.702 |
| % C$_{21+}$ | 4.2 | 3.9 | 3.1 | 3.8 | 4.3 | 3.8 | 5.4 | 4.4 | 3.6 | 3.2 | 3.9 | 3.7 | 4.0 | 4.1 | 3.9 |
| % CO$_2$ | 3.4 | 3.0 | 2.8 | 2.1 | 1.9 | 1.9 | 2.8 | 3.4 | 3.5 | 2.5 | 2.1 | 2.7 | 2.4 | 2.1 | 1.9 |
| % CH$_4$ | 19.0 | 18.5 | 18.5 | 18.2 | 18.3 | 19.2 | 15.7 | 17.2 | 16.8 | 24.9 | 25.5 | 26.1 | 27.3 | 26.5 | 25.9 |
| % C$_2$ | 2.4 | 2.3 | 2.4 | 2.3 | 2.2 | 2.2 | 2.2 | 2.2 | 2.2 | 3.1 | 3.2 | 3.3 | 3.4 | 3.3 | 3.2 |
| % C$_3$ | 5.7 | 5.5 | 5.8 | 6.5 | 6.6 | 6.8 | 5.4 | 5.1 | 4.8 | 8.4 | 8.1 | 8.0 | 10.4 | 10.0 | 9.8 |
| % C$_4$ | 4.1 | 4.0 | 4.2 | 4.7 | 4.8 | 5.0 | 5.3 | 4.8 | 4.6 | 6.1 | 6.4 | 6.5 | 6.5 | 7.1 | 6.5 |
| % C$_{5+}$ | 65.4 | 66.8 | 66.4 | 66.2 | 66.2 | 64.9 | 68.6 | 67.4 | 68.2 | 54.6 | 54.6 | 53.4 | 49.8 | 50.9 | 52.8 |
| % C$_2^=$/C$_2$ | 0.0 | 0.8 | 0.8 | 0.0 | 0.5 | 0.5 | 2.5 | 2.3 | 2.2 | 1.3 | 1.1 | 1.2 | 1.4 | 1.8 | 1.1 |
| % C$_3^=$/C$_3$ | 18.0 | 19.4 | 19.9 | 19.8 | 22.1 | 23.7 | 32.2 | 26.4 | 26.8 | 25.5 | 26.4 | 27.5 | 27.6 | 29.0 | 28.7 |
| % C$_4^=$/C$_4$ | 41.5 | 41.8 | 42.5 | 33.7 | 34.8 | 35.8 | 40.2 | 31.8 | 31.2 | 28.6 | 30.6 | 32.2 | 35.7 | 37.2 | 37.1 |
| % DOB | 7.6 | 7.1 | 7.0 | 5.5 | 5.3 | 4.8 | 6.2 | 5.9 | 8.8 | 7.0 | 6.6 | 6.4 | 6.1 | 6.3 | 5.6 |
| API Gravity | na | na | 63.1 | na | na | na | 61.8 | 61.9 | 61.8 | na | na | na | na | na | na |
| Cloud | na | na | 16 | 15 | 18 | 16 | 17 | 13 | 14 | na | na | na | na | na | na |
| Pour | na | na | 5 | 18 | 21 | 17 | 12 | 10 | 13 | na | na | na | na | na | na |
| Freeze | na | na | 18.8 | 18.8 | na | na | 19 | 16.6 | 14.9 | na | na | na | na | na | na |
| Olefins, wt % | 24 | 24 | 27 | 17 | 16 | 16 | 10 | 8 | 6 | 6 | 7 | 9 | 8 | 7 | 8 |

As can be seen from the results in Table 3, the $C_{5+}$ productivity of hybrid Fischer-Tropsch catalysts containing cobalt deposited on hybrid supports is high (greater than 0.5 g $C_{5+}$/$g_{cat}$/h), while at the same time, selectivity of desirable liquid hydrocarbons in the $C_{4-20}$ range is high and selectivity of undesirable $C_{21+}$ is low. At this low $C_{21+}$ amount, the wax fraction is completely soluble in the total hydrocarbon product; thus one advantage of hybrid Fischer-Tropsch synthesis catalyst is the lack of a separate, solid wax phase in the product. Also, the product contains no greater than 27 wt % olefins.

Where permitted, all publications, patents and patent applications cited in this application are herein incorporated by reference in their entirety, to the extent such disclosure is not inconsistent with the present invention.

Unless otherwise specified, the recitation of a genus of elements, materials or other components, from which an individual component or mixture of components can be selected, is intended to include all possible sub-generic combinations of the listed components and mixtures thereof. Also, "comprise," "include" and its variants, are intended to be non-limiting, such that recitation of items in a list is not to the exclusion of other like items that may also be useful in the materials, compositions, methods and systems of this invention.

From the above description, those skilled in the art will perceive improvements, changes and modifications, which are intended to be covered by the appended claims.

What is claimed is:

1. A hybrid Fischer-Tropsch catalyst comprising:
   a. a hybrid support having a pore volume of from 0.4 cc/g to 1.4 cc/g and a BET surface area of from 100 to 450 m²/g, the hybrid support comprising:
      i. at least one zeolite comprising at least 20 wt % of the hybrid support;
      ii. a binder material comprising at least 10 wt % of the hybrid support; and
      iii. a material selected from the group consisting of a silica-containing material, an alumina-containing material and a combination thereof comprising from 20-70 wt % of the hybrid support; and
   b. a Fischer-Tropsch component comprising 15 to 45 wt % cobalt deposited on the hybrid support.

2. The catalyst of claim 1, wherein the Fischer-Tropsch component further comprises a cobalt reduction promoter selected from the group consisting of platinum, ruthenium, rhenium, silver and combinations thereof.

3. The catalyst of claim 1, wherein the at least one zeolite is selected from the group consisting of ZSM-12, ZSM-5, ZSM-11, ZSM-23, ZSM-57, ZSM-22, ZSM-48, SSZ-32, SSZ-32X, SSZ-33, SSZ-53, SSZ-57, SSZ-59, beta, MCM-68, SAPO-11 and combinations thereof.

4. The catalyst of claim 3, wherein the silica-containing material further comprises a modifier selected from the group consisting of zirconium, strontium, niobium, hafnium, magnesium, titanium, zinc, cerium, gallium, barium and combinations thereof.

5. The catalyst of claim 1, wherein the binder material is selected from the group consisting of alumina, silica, titania, zirconia and combinations thereof.

6. The catalyst of claim 1, wherein the material selected from the group consisting of a silica-containing material, an alumina-containing material and a combination thereof comprises silica, gamma-alumina, silica-alumina, silica-zirconia, silica-titania or combinations thereof.

7. The catalyst of claim 1, wherein the hybrid support comprises from 25 wt % to 65 wt % silica-containing material.

8. The catalyst of claim 1, wherein the hybrid support comprises from 20 wt % to 40 wt % alumina-containing material.

9. The catalyst of claim 1, wherein the zeolite of the hybrid support further comprises a promoter selected from the group consisting of platinum, ruthenium, rhenium, silver, palladium, nickel, rhodium, iridium and combinations thereof.

10. The catalyst of claim 1, wherein the Fischer-Tropsch component comprises from 20 to 45 wt % cobalt.

11. The catalyst of claim 1, wherein the at least one zeolite comprises ZSM-12 and at least one zeolite selected from the group consisting of SSZ-32X and ZSM-48; the at least one zeolite further comprises a palladium promoter; the Fischer-Tropsch component comprises from 15 to 40 wt % cobalt; and the Fischer-Tropsch component further comprises a platinum promoter.

12. A hybrid Fischer-Tropsch catalyst comprising:
   a. a hybrid support having a pore volume of from 0.4 cc/g to 1.4 cc/g and a BET surface area of from 100 to 450 m²/g, the hybrid support comprising:
      i. at least one zeolite comprising at least 20 wt % of the hybrid support;
      ii. a binder material comprising at least 10 wt % of the hybrid support comprising alumina; and
      iii. silica or alumina comprising from 20-70 wt % of the hybrid support; and
   b. a Fischer-Tropsch component comprising 15 to 45 wt % cobalt deposited on the hybrid support.

* * * * *